June 25, 1968     CARL-AXEL BJORKENGREN     3,389,783
MATERIAL INTENDED FOR A FREEZING
PACKAGE, AND SUCH A PACKAGE
Filed March 23, 1967
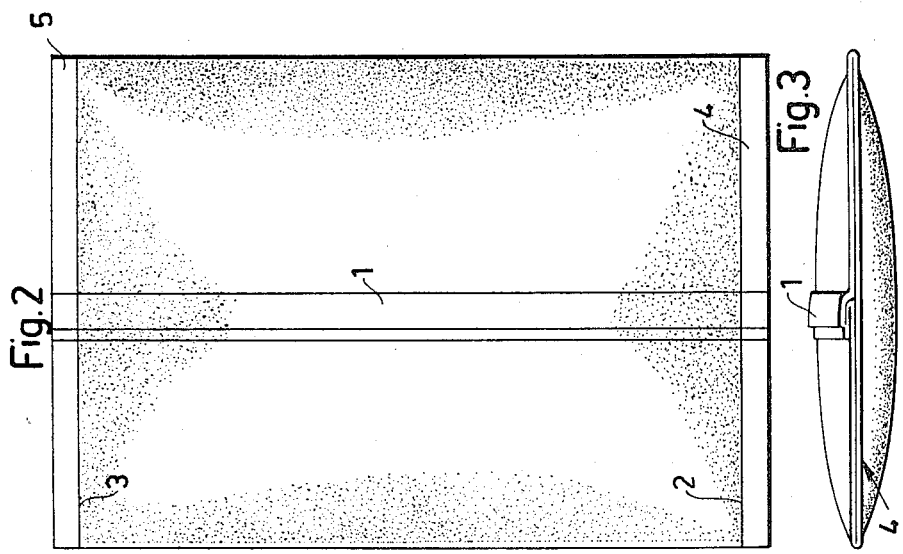
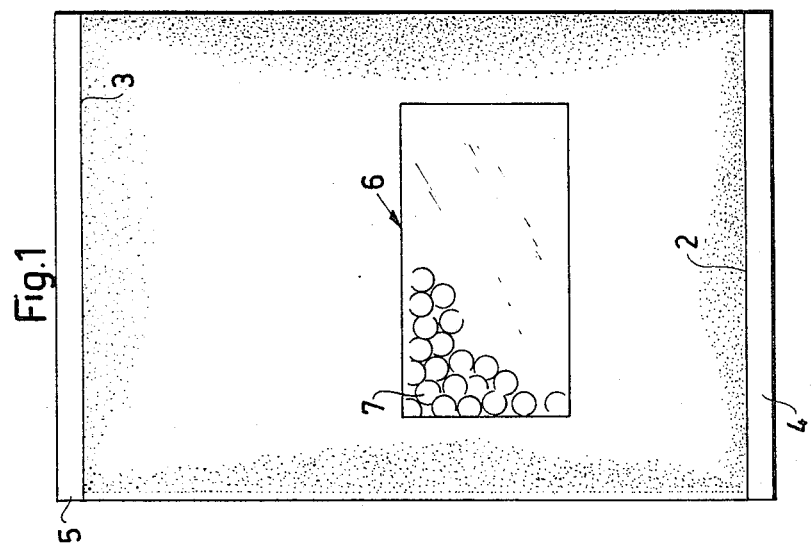

3,389,783
MATERIAL INTENDED FOR A FREEZING PACKAGE, AND SUCH A PACKAGE

Carl-Axel Bjorkengren, Akarp, Sweden, assignor to AB Akerlund & Rausing, a Swedish joint-stock company
Filed Mar. 23, 1967, Ser. No. 625,346
Claims priority, application Sweden, Apr. 7, 1966, 4,827/66
4 Claims. (Cl. 206—46)

ABSTRACT OF THE DISCLOSURE

A material for use in packaging deep-frozen food goods which enables the goods to be observed within the package comprises a base foil of an essentially transparent plastic material such as polyethylene or the like and a layer of an opaque heat conductive material such as an aluminum-bronze is applied thereto to substantially equalize temperatures of the food goods within the package. The layer of heat conductive material covers the entire area of the package except for a comparatively small "window" area which enables one to observe the food goods through the transparent base foil.

As an alternative, the heat conductive layer may cover the entire area of the package but can be made thinner in those areas where observation windows are desired, these thinned areas being substantially transparent.

The packaging material may consist of a single base foil and heat conductive layer thereon, or it may consist of two base foils between which the heat conductive material is dispersed in the adhesive which bonds the two base foils together.

---

Food goods to be deep-frozen are normally packed in cartons and completely sealed packages of a similar kind, in which the goods cannot be inspected before the sealing is broken. This is, of course, a considerable disadvantage. Besides, the price of such pacakges is high.

It has proved desirable to pack food goods to be deep-frozen in transparent materials, e.g., in bags of polyethylene. Experiments with such packages have shown, however, that great problems arise as a consequence of the fact that the packed goods have undergone a rapid deterioration as to quality, which fact has been ascribed to the influence of light. Thus, packed peas have cracked and obtained a yellow surface.

Extensive experiments have shown that this deteriorated quality strictly taken is a so-called frost burn, i.e., a desiccation of the exposed surface layer of the packed food goods and that this desiccation is probably due to the fact that this surface layer will be exposed during storage to about 4° higher temperature than the unexposed parts of the goods. With such a temperature distribution, moisture will pass from the warmer portions to the colder portions.

It has also been found that the problems may be solved by equalizing the temperature between the various parts of the finished package. This equalization is obtained according to the invention by means of a material which is consequently intended for the manufacture of packages where the packed goods are deep-frozen and which chiefly consist of a foil in the nature of a sheet or web of plastic material, the characteristic feature of the invention consisting of a heat-conductive layer adapted to give an even distribution of heat obtained chiefly from the darkness radiation to which the package is exposed during storage in for instance freeze-counters and freeze-boxes.

By means of a heat-distributing layer of the kind mentioned above it has proved possible to keep down the temperature differences to some tenth of a degree, in which case the frost burn described above does not appear. This has turned out to apply even if certain minor portions of the material are left free from ink during the printing or inking, so as to form "windows" through which the packed goods can be inspected. The adhesives of the printing ink may consist of for instance polyvinyl acetate or nitrocellulose.

Preferably, the heat-conductive layer is provided between two outer plastic layers in a laminate. Alternatively it may, however, also constitute a coating or a print on a one-layer plastic material.

If the heat-conductive layer is provided inside a plastic laminate, it may consist of aluminum-bronze or a similar covering pigment dispersed in the bonding agent holding the various laminated layers together, the said agent consisting of for instance polyurethane or epoxy plastic.

In case the heat-conductive layer comprises aluminum-bronze, the layer also has good heat-reflecting qualities, which has proved valuable for avoiding an increased temperature in the package. Thus, part of the heat which would otherwise make the top side of a package warmer than the bottom thereof is reflected. At the same time that part of the heat which cannot be prevented from being absorbed by the package is distributed quickly and evenly.

The invention also comprises packages made from the materials described above. These packages are preferably provided with windows of the above kind, i.e., minor surfaces are left free from ink.

In the appended drawing, a package according to the invention is shown by way of example.

FIG. 1 shows the front of the package,
FIG. 2 shows the back of the package, and
FIG. 3 shows an end view of the package.

The package shown is manufactured by shaping a web-like flexible material as a tube and giving it a longitudinal seal 1, in which the material is heat-sealed with the insides against each other. The shaped tube is then given a bottom seal by being heat-sealed within a narrow zone 2. The package is filled, e.g. by means of a filling pipe projecting into the shaped tube, whereupon it is sealed at its top end by means of a second narrow zone 3. As a result of the seals 2 and 3, the pillow type package obtains two sealing fins 4 and 5. The package shown differs from other known packages principally in the nature of the material used for its manufacture. This means that the material comprises a heat-conductive layer for distributing, above all, the heat to which the package is exposed when being stored in for instance open freezeboxes and freeze-counters in the shops. Reference numeral 6 designates a window which has been left uncovered by the heat-conductive layer, so that the packed goods, e.g., peas 7, may be inspected without breaking the seal of the package. Alternatively, the heat-conductive layer may be made thinner within the area of the window 6 so as to make the said layer largely transparent. It has turned out, however, that it is possible to leave up to about one fourth of the exposed surface free from the heat-conductive layer without any considerable risk, in which case a reasonably even temperature distribution is obtained despite this.

The invention is not, of course, restricted to the example described above but may be varied within the scope of the following claims. Thus, polyethylene is meant to be used as the basic material in the example shown, but other materials may of course also be used, such as polypropene, polyvinyl chloride, polyvinylidene chloride, etc. If a lamainate is used, different materials may be combined.

I claim:

1. A pillow type package for and containing deep-frozen food goods intended for storage in open freeze-counters or the like subject to light wherein the walls of said package are constituted by a base foil of transparent flexible plastic material such as polyethylene or the like and an opaque layer of heat conductive material thereon serving to provide an even distribution of heat obtained principally from the darkness radiation to which the package is exposed, said heat conductive layer covering all of said base foil except for a comparatively small area serving as a window through which the package food goods may be observed.

2. A food goods package as defined in claim 1 wherein said layer of heat conductive material is constituted by an aluminum-bronze.

3. A food goods package as defined in claim 1 which comprises two of said base foils between which said layer of heat conductive material consisting of an aluminum-bronze is dispersed in an adhesive which bonds said base foils together.

4. A pillow type package for and containing deep-frozen food goods intended for storage in open freeze-counters or the like subject to light wherein the walls of said package are constituted by a base foil of transparent flexible plastic material such as polyethylene or the like and a layer of heat conductive material thereon serving to provide an even distribution of heat obtained principally from the darkness radiation to which the package is exposed, said heat conductive layer being essentially opaque over most of the wall area but being essentially transparent over a comparatively small area serving as a window through which the packaged food goods may be observed.

References Cited

UNITED STATES PATENTS

| | | | |
|---|---|---|---|
| 2,677,965 | 5/1954 | Saffir | 206—16.5 |
| 2,715,089 | 8/1955 | Michener et al. | 229—3.5 |
| 2,955,056 | 10/1960 | Knox | 206 |
| 3,012,894 | 12/1961 | Nagel | 99—192 |
| 3,132,344 | 5/1964 | Langdon | 206—46 |
| 3,175,748 | 3/1965 | Flamm et al. | 229—6 |
| 3,291,377 | 12/1966 | Eggen | 229—87 |
| 3,322,319 | 5/1967 | Sweeney et al. | 229—3.5 |

FOREIGN PATENTS 1,209,082  2/1960  France.

WILLIAM T. DIXSON, Jr., *Primary Examiner.*